United States Patent [19]
Pailler

[11] 4,450,794
[45] May 29, 1984

[54] TWO STROKE ENGINE

[76] Inventor: Yves Pailler, Cieux, 87520 Oradour-sur-Glane, France

[21] Appl. No.: 463,506

[22] Filed: Feb. 3, 1983

[30] Foreign Application Priority Data

Feb. 3, 1982 [FR] France ............................. 82 01685

[51] Int. Cl.³ ............................................. F02B 33/12
[52] U.S. Cl. .............................. 123/74 R; 123/73 R; 123/74 A
[58] Field of Search ................ 123/74 R, 74 A, 74 B, 123/74 C, 74 D, 74 AE, 74 AC, 74 AP, 74 AA, 73 R, 73 A, 73 AC, 73 AE, 73 AF, 73 F, 73 FA, 73 PP

[56] References Cited

U.S. PATENT DOCUMENTS

| | | | |
|---|---|---|---|
| 859,383 | 7/1907 | Hendry | 123/74 A |
| 1,103,089 | 7/1914 | Scott | 123/74 A |
| 1,309,312 | 7/1919 | Barker | 123/74 A |
| 2,063,666 | 12/1936 | Exel | 123/74 A |
| 2,083,808 | 6/1937 | Andrews | 123/74 A |
| 2,352,396 | 6/1944 | Maltby | 123/74 A |
| 3,487,818 | 1/1970 | Dineen | 123/74 R |

FOREIGN PATENT DOCUMENTS

| | | | |
|---|---|---|---|
| 459133 | 4/1928 | Fed. Rep. of Germany | 123/65 V |
| 464167 | 11/1932 | Fed. Rep. of Germany | 123/74 A |

*Primary Examiner*—Wendell E. Burns
*Attorney, Agent, or Firm*—Larson and Taylor

[57] ABSTRACT

A two-stroke engine is provided comprising at least one cylinder (1) in which is slidingly mounted a piston (2) which defines in this cylinder a combustion chamber (C) and a precompression chamber (P), the lateral cylindrical wall of the cylinder being provided with at least two ports closable by the piston (2), namely at least one transfer port (3) through which opens a transfer channel (4) connecting the two chambers together and at least one exhaust port (5) communicating with an exhaust pipe (6). These two ports are arranged and disposed so that the opening of the transfer port (3) begins before that of the exhaust port (5) and special means are provided for making the pressure of the fresh gases admitted into the combustion chamber (C) through the transfer port (3), during opening of this transfer port, sufficiently high with respect to that of the burnt gases then present in the combustion chamber.

8 Claims, 3 Drawing Figures

TWO STROKE ENGINE

The invention relates to two-stroke engines comprising at least one cylinder in which is slidingly mounted a piston which defines in this cylinder a combustion chamber and a precompression chamber, the lateral cylindrical wall of the cylinder being provided with at least two ports closable by the piston, namely at least one transfer port through which opens a transfer channel connecting together the two chambers and at least one exhaust port communicating with an exhuast pipe.

It applies in particular to high efficiency engines of this type, such as light aeroplane engines and outboard engines for boats.

An interesting application — but not exclusive — of the invention is that of engines in which each piston is mounted at the head of a cylindrical rod itself slidingly mounted in a boss connected to the corresponding cylinder, the shape of the boss being substantially complementary to the inner surface of the piston and each rod being connected to the crank-shaft of the engine through an excentric, as has been described in U.S. Pat. No. 3,946,706 of the Applicant.

In known embodiments of the engines in question, the exhaust ports begin to open before the transfer ports so that the combustion chamber is emptied of its burnt gases before being filled with fresh gases.

Special measures ("exhaust tuning") must then be taken so as to allow the burnt gases to flow back to the combustion chamber before the exhaust ports are totally closed, so as to prevent the escape of fresh gases through these ports.

The measures in question are delicate to achieve, they lead to cumbersome constructions and they are only valid for certain operating conditions.

The invention avoids recourse to such special measures.

More generally, it allows the air and fuel supply of the engine to be improved and thus the efficiency of this engine and the power developed thereby to be increased.

To this end, the engines of the kind in question are essentially characterized in that their ports are arranged and disposed so that the opening of the transfer port begins before that of the exhaust port and in that special means are provided for making the pressure of the fresh gases admitted into the combustion chamber through the transfer port, during opening of this transfer port, sufficiently high with respect to the burnt gases then present in this combustion chamber.

In preferred embodiments, recourse is further had to one and/or the other of the following arrangements:

the pressure of the fresh gases admitted into the combustion chamber through the transfer port is made at least equal to that of the burnt gases occupying this chamber, the pressure of the fresh gases is made high, during opening of the transfer port, by giving a low value to the volume of the precompression chamber, in an engine in accordance with the preceding paragraph, the precompression chamber is defined respectively at both its axial ends by the inner surface of the piston and by a boss of substantially complementary shape connected to the cylinder, inside which boss is slidingly mounted a rod coupled to the piston, the pressure of the burnt gasses is reduced, during opening of the transfer port, by forming in the lateral wall of the cylinder a port of small section communicating with the exhaust pipe of the engine and adapted to be opened a little before the exhaust ports properly speaking, in an engine according to the preceding paragraph, the small section port is connected to the exhaust pipe through successively a decompression chamber and a calibrated passage, the forms and dimensions of this chamber and of this passage being determined so that the pressure of the burnt gases inside the decompression chamber is comparable to that of the fresh gases which have just been introduced into the combustion chamber once the transfer port is closed, means are provided for ensuring an indirect injection of petrol or gasoline through the transfer ports at certain times when these latter are open, the intake of fresh gases into the precompression chamber comprises a non-return flap means and the intake pipe containing this non-return device has a length greater than four times the inner diameter of the cylinder.

The invention comprises, apart from these main arrangements, certain other arrangements which are used preferably at the same time and which will be more explicitly discussed hereafter.

In what follows, preferred embodiments of the invention will be described with reference to the accompanying drawings in a way which is of course in no wise limiting.

FIG. 1, of these drawings, shows in partial axial section an engine constructed in accordance with the invention.

Figure 1:
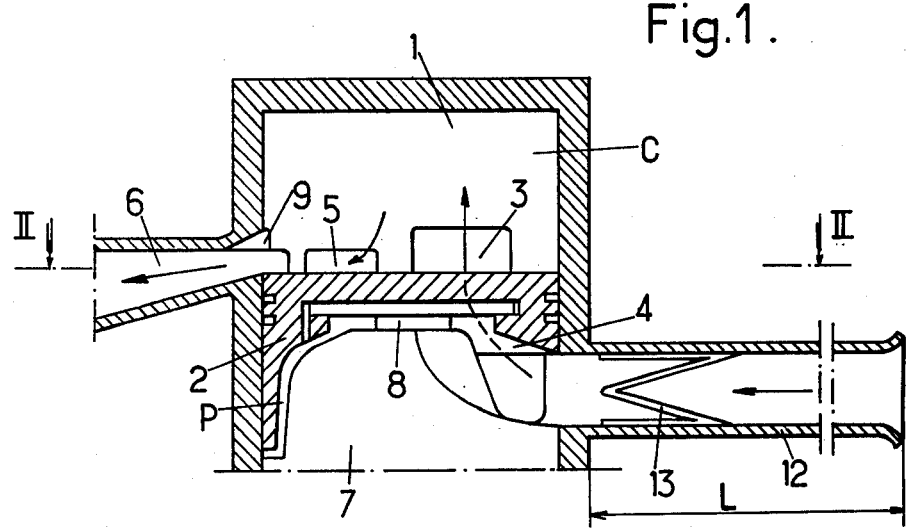

The two-stroke engine considered comprises at least one cylinder 1 in which is slidingly mounted a piston 2 which defines in this cylinder a combustion chamber C and a precompression chamber P, the cylindrical lateral wall of the cylinder being formed with at least two ports closable by piston 2, namely at least one transfer port 3 through which opens a transfer channel 4 connecting the two chamber P and C together and at least one exhaust port 5 communicating with an exhaust pipe 6.

Ports 3 and 5 are here arranged and disposed so that opening of the transfer port 3 begins before that of the exhaust port 5.

Moreover, special means are provided for making the pressure of the fresh gases admitted into combustion chamber C through transfer port 3, during opening of this port, sufficiently high with respect to that of the burnt gases then present in said chamber C.

Experience shows that, because of this relatively high pressure of the fresh gases admitted — which pressure is preferably at least equal to that of the burnt gases then present in the combustion chamber — , these burnt gases do not prevent intake of these fresh gases into the chamber in question and, despite that, the exhaust concerns practically only the burnt gases, which arrive first at the level of the exhaust ports 5.

The required increase in relative pressure may be obtained by increasing the pressure of the fresh gases admitted and/or by reducing the pressure of the burnt gases removed.

To increase the pressure of the fresh gases admitted, they are precompressed by giving more especially to the precompression chamber P a very small minimum volume, this chamber being defined by a boss 7 connected to cylinder 1 and whose shape is substantially complementary to the inner surface of piston 2.

In this case, this piston is mounted on a rod 8 itself slidingly mounted in boss 7 and connected to the crankshaft of the engine through an excentric, for example in the way described in the above-mentioned U.S. patent.

The operation of such an engine is the following.

When the transfer ports 3 open, the fresh gases begin to penetrate into combustion chamber C, whose volume increases because of the advance of piston 2 to its bottom dead center. When the exhaust ports open in their turn, a violent current is established, the burnt gases then being sucked up on the one hand by the depression of the exhaust and pushed back on the other hand by the high pressure fresh gases which are then projected towards the inside of chamber C, and preferably towards the top of the cylinder.

When the exhaust ports close again, the fresh gases continue to fill chamber C, because of their kinetic energy, until the transfer ports 3 close in their turn.

The dynamic filling of chamber C thus obtained is much better than in a low compression two-stroke engine, it is no longer necessary to have recourse to special measures for causing the exhaust gases to flow back towards the cylinder and the exhaust pipe is simplified and less cumbersome.

If the pressure of the burnt gases is still too high at the beginning of opening of the transfer ports 3, it may be advantageous to provide a channel or "leak" 9 of very small section with respect to that of the exhaust ports 5 properly speaking, this small section being accurately calibrated: the channel in question opens into combustion chamber C at a level in this chamber a little closer to the bottom of the cylinder than the exhaust ports 5, this level possibly almost reaching that of the edge, of the transfer ports 3, the closest to said bottom.

Channel 9 in question allows the pressure of the burnt gases contained in combustion chamber C to be reduced to a suitable value during opening of the transfer ports 3, but its very small section prevents undesirable losses of the fresh gases at the end of admission.

Figure 3:
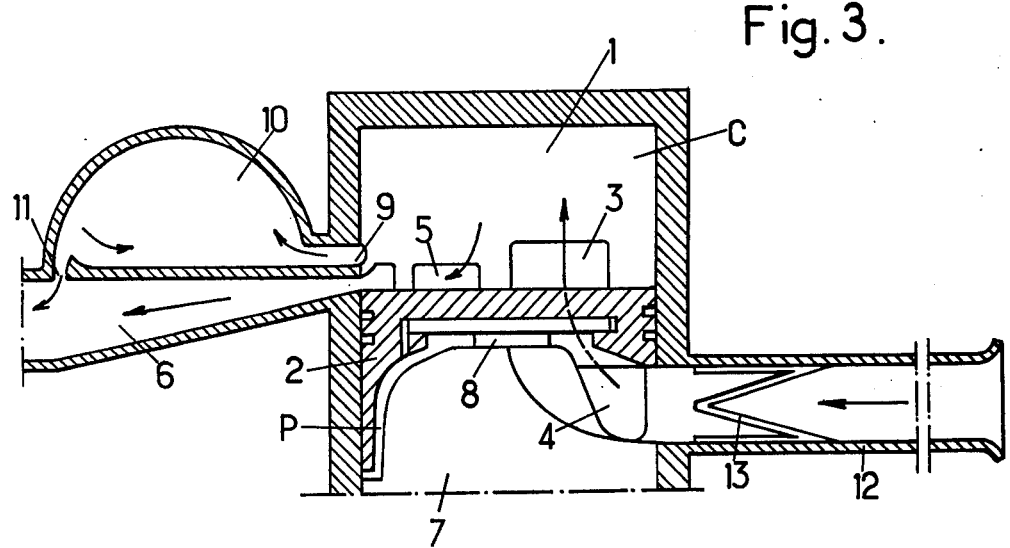
FIG. 3 shows an engine variation constructed in accordance with the invention in partial axial section like FIG. 1.
Figure 2:
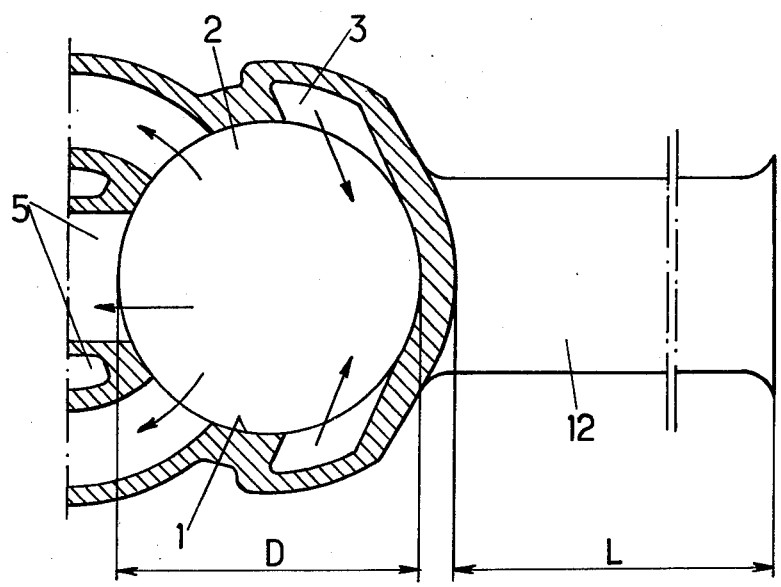
FIG. 2 shows the same engine in partial cross section along II—II of FIG. 1.

In a more perfected version illustrated in FIG. 3, channel 9 does not open directly into the exhaust pipe 6: it ends at a decompression chamber 10 itself connected to the exhaust pipe through a second calibrated passage 11. The shape and volume of this chamber 10 and the section of passage 11 are calculated so that the pressure of the burnt gases inside this chamber 10 is of the same order as that of the fresh gases in combustion chamber C during closing of the transfer ports 3, so as to avoid any undesirable loss of the fresh gases to the exhaust pipe.

Since the opening of the transfer ports 3 is maintained for a large angular movement of the drive shaft, which movement is greater than that corresponding to the opening of the exhaust ports 5, advantage may be taken thereof to ensure an indirect injection of petrol through these openings without loss of fuel to the exhaust, under conditions close to those observable for the indirect injection into four stroke engines.

Of course, in this case, the injection pump will be adjusted so as to allow injection at opportune moments, corresponding generally to the period when the exhaust ports have just closed and when the transfer ports are still open, with retard for slow running and advance for fast running.

In the pipe 12 for the intake of fresh gases into precompression chamber P, there is advantageously provided a non return disk or flap device 13.

Under very high running conditions, if a flap device is provided, the flaps may be perturbed in their operation: in such a case, it is advantageous to provide the non return by conferring directly on the column of fresh gases admitted a sufficient kinetic energy; to this end, the intake pipe 12 is advantageously given a relatively great length L, which length is preferably at least four times greater than the inner diameter D of the cylinder.

The long column of fresh gases then contained in this intake pipe opposes by its very inertia the precompressed gases from being driven outwardly through said pipe.

As is evident and as it follows moreover already from what has gone before, the invention is in no wise limited to those of its modes of application and embodiments which have been more especially considered; it embraces, on the contrary, all variations thereof.

I claim:

1. A two-stroke engine comprising at least one cylinder (1) in which is slidingly mounted a piston (2) which defines in this cylinder a combustion chamber (C) and a precompression chamber (P), the cylindrical lateral wall of the cylinder being formed with at least two ports closable by the piston (2), namely at least one transfer port (3) through which opens a transfer channel (4) connecting the two chambers together and at least one exhaust port (5) communicating with an exhaust pipe (6), characterized in that these two ports (3,5) are arranged and disposed so that the opening of the transfer port (3) begins before that of the exhaust port (5) and in that special means are provided for making the pressure of the fresh gases admitted into the combustion chamber (C) through the transfer port (3), during opening of this transfer port, sufficiently high with respect to that of the burnt gases then present in the combustion chamber.

2. The two-stroke engine according to claim 1 characterized in that said pressure of the fresh gases is at least equal to that of the burnt gases.

3. The two-stroke engine according to claim 1 characterized in that the pressure of the fresh gases is made high, during opening of the transfer port (3), by giving a small value to the volume of the precompression chamber (P).

4. The two-stroke engine according to claim 3 characterized in that the precompression chamber (P) is defined respectively at its two axial ends by the inner surface of the piston (2) and by a boss (7) of substantially complementary shape connected to the cylinder (1), inside which boss is slidingly mounted a rod (8) coupled to the piston.

5. The two-stroke engine according to claim 1 characterized in that the pressure of the burnt gases is reduced, during opening of the transfer port (3), by forming in the lateral wall of the cylinder a port (9) of small section communicating with the exhaust pipe (6) of the engine and adapted to be opened a little before the exhaust ports properly speaking (5).

6. The two-stroke engine according to claim 5 characterized in that the port (9) of small section is connected to the exhaust pipe through successively a decompression chamber (10) and a calibrated passage (11), the shapes and dimensions of this chamber (10) and of this passage (11) being determined so that the pressure of the burnt gases inside the decompression chamber (10) is comparable to that of the fresh gases which have just been introduced into the combustion chamber (C) at the end of closing of the transfer port (3).

7. The two-stroke engine according to claim 1 characterized in that means are provided for ensuring an indirect injection of petrol through the transfer ports at some of the times when these latter are open.

8. The two-stroke engine according to claim 1 comprising in the fresh air intake to the precompression chamber a flap non return device (13), characterized in that the intake pipe (12) containing this non return device has a length greater than four times the inner diameter of the cylinder.

* * * * *